Nov. 19, 1929.　　　G. F. ROYER　　　1,736,054
SEPARATOR FOR GRANULAR MATERIAL
Filed July 7, 1927　　2 Sheets-Sheet 1

Inventor
George F. Royer,
By Cushman, Bryant & Darby
Attorney

Nov. 19, 1929.    G. F. ROYER    1,736,054
SEPARATOR FOR GRANULAR MATERIAL
Filed July 7, 1927    2 Sheets-Sheet 2
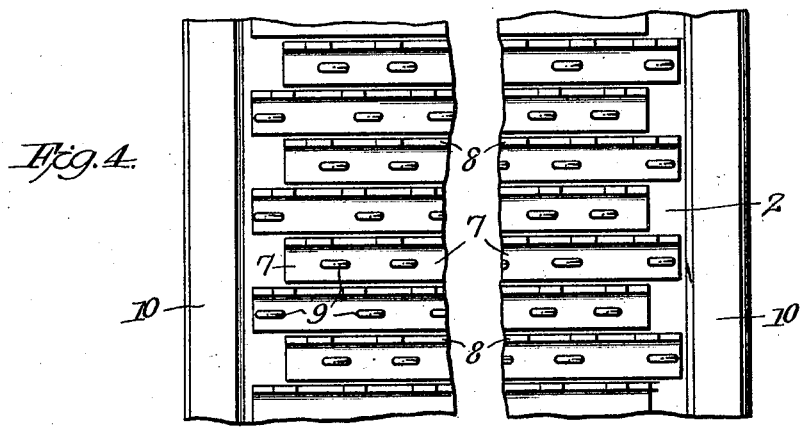
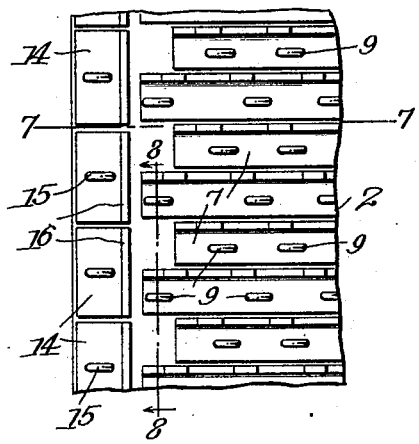
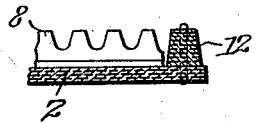
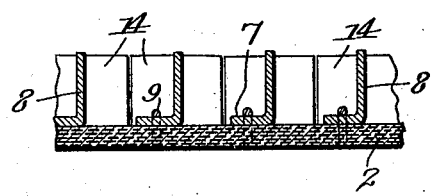
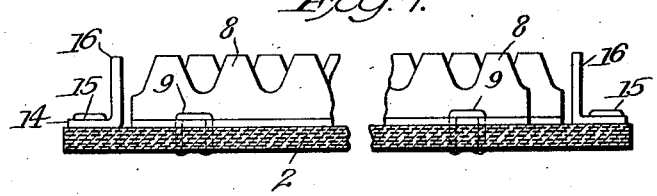
Inventor
George F. Royer Patented Nov. 19, 1929

1,736,054

UNITED STATES PATENT OFFICE

GEORGE F. ROYER, OF WILKES-BARRE, PENNSYLVANIA, ASSIGNOR TO ROYER FOUNDRY AND MACHINE CO., OF WILKES-BARRE, PENNSYLVANIA, A CORPORATION OF PENNSYLVANIA

SEPARATOR FOR GRANULAR MATERIAL

Application filed July 7, 1927. Serial No. 204,028.

The present invention relates to improvements in separators for granular material of the type or class in which the material to be treated is deposited in a hopper or between lateral walls upon a vertically inclined endless belt, provided with outwardly projecting sprigs, preferably of metal, which act to separate and collect small particles from the mass, said particles being discharged as the belt passes over the upper supporting pulley or roller.

Separators of this type are particularly useful in the treatment of molders' sand, to separate the sand particles from undersirable materials, such as nails, pieces of metal, etc., that may have become mixed therewith, and to mix such separated particles with particles of fresh sand supplied to the belt. As the belt is rotated at a relatively high speed, the particles collected thereby are discharged through the air to a point at a considerable distance from the belt, thus aerating the sand with the attending beneficial results in forming molds therefrom.

The present invention relates particularly to the construction of the separator belt of such an apparatus, and this may be used for treating material other than molder's sand. However, as an example, the improvements are shown as embodied in a machine particularly designed for treating molder's sand.

In the accompanying drawing:

Figure 4 is a plan of the separating belt.

Figure 5 is a sectional detail of a slightly modified form of belt.

Figure 6 is a plan of another modified form of belt.

Figure 7 is a sectional view substantially on the line 7—7 of Figure 6.

Figure 8 is a view substantially on the line 8—8 of Figure 6.

Figure 1:
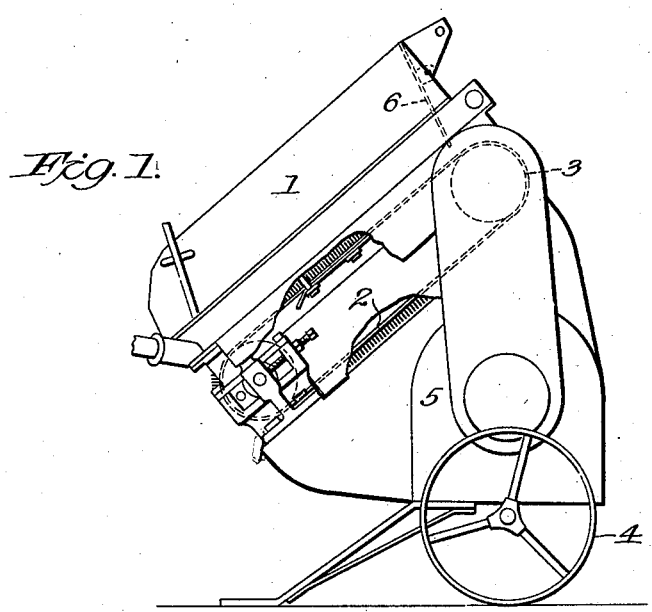
Figure 1 is an elevation, partly broken away, of a molding sand treating and blending machine provided with an embodiment of the present invention.

Referring to the drawings, in the several views of which like parts are designated by the same reference characters, the particular embodiment of the invention illustrated includes a hopper 1, which is arranged in a vertically inclined position, and the bottom of which is formed by an endless belt 2, supported by suitable pulleys and provided with outwardly projecting metal sprigs which will act upon material deposited in the hopper 1 to separate particles therefrom, the separated particles collected upon the belt in the spaces between the sprigs being discharged as the belt passes over the upper supporting roller or pulley 3.

The separator belt and hopper are, as shown, mounted on a suitable truck having ground wheels 4, so that it is readily movable over a foundry floor or other supporting surface. The frame of the truck includes angle iron members 20 between which the hopper 1 is positioned and the inwardly directed lower edge portions 11 of the side walls of the hopper, hereinafter referred to, are strengthened by angle iron strips 21 attached to the members 20. On the truck, within a suitable casing 5, is mounted a motor, preferably an electric motor, and this, through suitable sprocket and chain gearing, drives the upper belt supporting roller 3 at a relatively high speed.

Nails, pieces of metal, and other undesirable material that may be mixed with the molder's sand, are prevented from being carried over the belt supporting roller 3 by suitable yielding fingers 6, arranged at the upper end of the hopper 1.

As before noted, the particular subject matter of the present invention is the separator belt, and although one form of apparatus in which it is particularly useful has been thus briefly described, it is not to be understood that the invention is in any sense limited to this particular use.

The belt 2 is preferably made of woven textile material, and the sprigs, which constitute the separating means, are formed by angularly shaped metal plates, the bases of which are firmly secured to the body of the belt, while the angular portions thereof extend outward from the belt, and the free edges of which are serrated.

Figure 2:
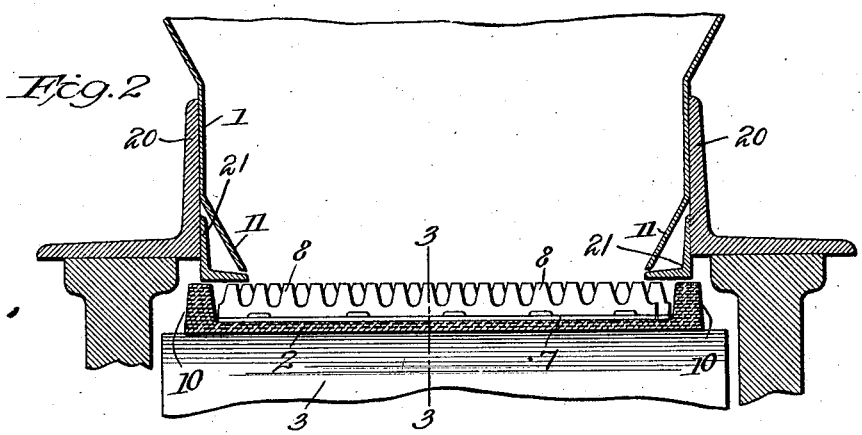
Figure 2 is a transverse sectional view through the hopper and upper portion of the separating belt of such a machine.

As shown in Figure 2, all the sprigs in a row may be integral, or have a single base plate 7 which extends continuously throughout the length of the row, or a plurality of shorter plates may be arranged in transverse alignment. The outward projecting flange of each plate is, as above stated, serrated to provide a plurality of sprigs 8, and the several plates are arranged in rows, so that spaces are provided to receive the small particles of the sand, or other material, separated from the mass of material deposited in the hopper 1.

The base members 7 of each sprig plate may be fastened securely to the body of the belt in any suitable manner. As shown, the fastening means comprise staple-like rivets 9, which extend through apertures in the plate and penetrate the body of the belt 2.

Figure 3:
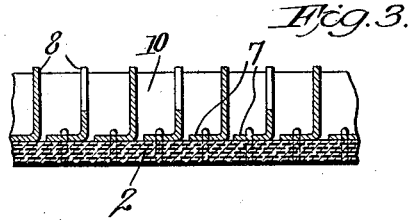
Figure 3 is a detail section substantially on the line 3—3 of Figure 2.

As shown particularly in Figures 3 and 4, the several plates are so arranged upon the belt 2 that the sprigs 8 of one are out of alignment, longitudinally of the belt with the sprigs of the next plate in the series, and, preferably, also as shown in Figure 4, the several plates do not all extend to both edges of the belt 2, but every alternate plate is set back some distance from one edge of the belt. That is the ends of alternate rows of sprigs are situated nearer the adjacent side edge of the belt than the corresponding ends of the intermediate rows (see Figures 2, 4, 6 and 7). This relative arrangement of the ends of the rows of sprigs and the edge of the belt is duplicated at both edges of the belt, so that while the rows of sprigs are all of equal length the ends of each row are spaced differently from the adjacent edges of the belt.

The sprigs in every row extend throughout the width of the space separating the lower edges of the side walls of the hopper, so that the entire lower surface of material in the hopper is subjected to the combing action of the sprigs, but the relative arrangement of the plates is such that pockets are formed at the ends of the rows as well as between successive plates in the series.

Practical experience with machines embodying the invention herein described has shown that by providing the spaces or pockets at the ends of the rows of sprigs the tendency of the sand to clog between the ends of the rows of sprigs and the marginal beads or ribs on the belt is materially reduced. When the rows of sprigs are all of the same length and all extend to the maximum extent across the belt there is a tendency for the sand to clog between the ends of the rows of sprigs and the marginal beads or ribs to such an extent as to interfere with its free expulsion by the action of centrifugal force as the belt passes over the upper supporting pulley.

A distinguishing feature of the present invention is that the separator belt is provided with marginal flange-like portions, projecting outward from the sprig supporting face, adjacent its edges, so that particles collected in the spaces between the sprigs cannot escape laterally over the edges of the belt. Such marginal flange-like members may, as shown in Figure 2, be formed integrally with the body of the belt, or they may, as illustrated in the modified forms which will be hereinafter more particularly described, be formed initially separate from the body of the belt and suitably attached thereto.

Referring to Figure 2 it will be seen that the marginal beads or flange-like portions of the belt 2, which, as shown, are formed integrally with the woven body, extend outward substantially to the plane of the outer edges of the sprigs 8, and constitute the bottom of the hopper 1, the lower portions of the side walls 11 of which are shown as being inclined inward somewhat, so that the width of the hopper adjacent the belt is less than at its outer open end.

Instead of making the marginal beads or flange-like portions 10 integral with the body of the belt, such portions may be formed of strips of material similar to the body of the belt, as 12, and these secured to the belt body by sewing, riveting, or other suitable means.

Figures 6 to 8 illustrate another slightly modified form of separator belt. In this embodiment of the invention, the marginal flanges preventing passage of material collected by the belt over the edges thereof are each formed of a series of relatively short angle plates, the base members 14 of which are secured by rivets 15, or similar fastening devices, to the body of the belt, and the outward projecting flange portions 16 of which are arranged in alignment longitudinally of the belt. The successive plates 14 are separated just sufficient to provide the necessary flexibility in the belt to permit it to pass around the supporting rollers or pulleys, and the spaces between the successive plates are so small that particles of material collected by the belt will not escape therethrough.

As previously described, and as shown in Figure 2, the lower portions 11 of the side walls of the hopper are inclined inward and said inclined portions extend over angle iron frame members. The portions 11 of the hopper walls and the bottom flanges of said frame members extend over the end members of the rows of sprigs, so that material deposited in the hopper cannot fall directly into the spaces between the ends of the rows of sprigs and the edges of the belt, but such material is laterally confined in the path of the sprigs.

The operation and advantages of the invention will, it is believed, be readily appreciated from the foregoing description in connection with the drawings.

The mass of material deposited in the hopper 1 will be laterally confined in the path of the outer ends of the sprigs on the belt by the side walls of the hopper 1 and will be subjected to a combing or scraping action by said sprigs on the rapidly travelling separator belt. The small particles thereby separated and collected in the spaces between the sprigs will be discharged in a stream from the upper end of the belt, and the supporting pulley or roller 3.

The construction of the belt is such that the particles collected thereby will not be permitted to escape over the side edges, and it is not necessary to provide the frame of the machine with means for preventing such spilling of the separated particles.

It will be understood that in the drawings, the parts are shown more or less conventionally, and diagrammatically, and that there can be variation in some of the details shown without departing from the invention.

I claim:

1. A separator comprising a driven endless belt having longitudinally extending edge members projecting from one face, and a plurality of rows of sprigs extending transversely of said face of the belt, the ends of alternate rows of said sprigs being spaced from one of the edge members a distance greater than that separating the ends of intermediate rows from the same edge member.

2. A separator comprising a driven endless belt provided with outwardly projecting edge members and having within the channel formed by said members and the belt a series of rows of outwardly projecting sprigs, the ends of successive rows being spaced at different distances from the adjacent edge member.

3. A separator comprising a driven endless belt provided with outwardly projecting edge members and having within the channel formed by said members and the belt a series of rows of outwardly projecting sprigs, the ends of alternate rows being spaced from the adjacent edge member a distance greater than that separating the ends of intermediate rows from that edge member, and the opposite ends of the rows being related to the other edge member.

In testimony whereof I have hereunto set my hand.

GEORGE F. ROYER.